3,075,792
TUBE CONNECTOR
George E. Franck, Riverside, Ill., assignor to Imperial-Eastman Corporation, a corporation of Illinois
Filed July 8, 1959, Ser. No. 825,700
1 Claim. (Cl. 285—178)

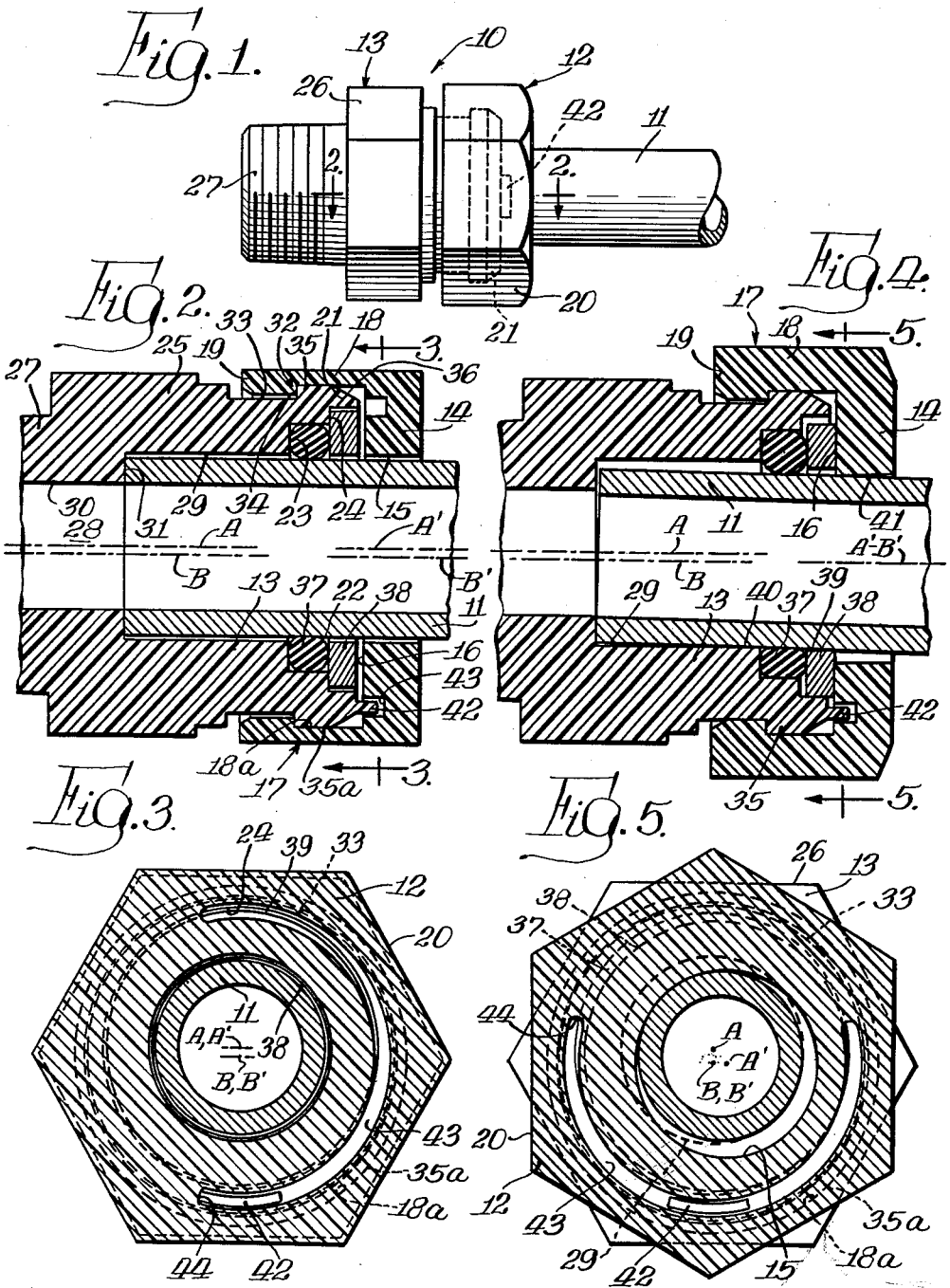
Jan. 29, 1963 — G. E. FRANCK — 3,075,792
TUBE CONNECTOR
Filed July 8, 1959
INVENTOR.
George E. Franck United States Patent Office
3,075,792
Patented Jan. 29, 1963

This invention relates to fittings and in particular to quick connection connectors.

The principal object of the instant invention is to provide a new and improved connector arranged for facilitating a hand-tightened connection of a tube end to another element.

Another object is to provide such a connector having a body and a nut each having a bore therethrough arranged to receive the tube end freely therein when said bores are in axial alignment, and means for displacing the axis of one of the body and nut bores transversely relative to the axis of the other of the body and nut bores to grip the tube end between longitudinally disaligned portions of the walls of the body and nut bores.

A further object is to provide such a connector wherein the means for displacing the axis comprises an annular securing means on the body and a co-operating annular securing means on the nut, at least one of the annular securing means being eccentrically related to the bore of the one of the body or nut on which it is disposed.

A yet further object is to provide such a connector wherein the body is provided with a cylindrical recess in its outer end, and a locking ring in said recess and having an inner diameter slightly larger than the external diameter of the tube end for gripping the tube end upon axial disalignment of the body and nut bores.

Other features and advantages of the invention will be apparent from the following description, taken in connection with the accompanying drawing wherein:

FIG. 1 is an elevation of a connector embodying the invention, with a tube end connected thereto;

FIG. 2 is an enlarged diametric section taken substantially along the line 2—2 of FIG. 1, with the body and nut bores in axial alignment to receive the tube end;

FIG. 3 is a transverse section taken substantially along the line 3—3 of FIG. 2;

FIG. 4 is a fragmentary enlarged diametric section generally similar to that of FIG. 2 but with the nut disposed to effect a locked connection of the tube end to the connector; and FIG. 5 is a transverse section taken substantially along the line 5—5 of FIG. 4 but with certain hidden edges not shown to illustrate more clearly the eccentric relationship of the body and nut bores in the tube locking disposition.

In the exemplary embodiment of the invention, as disclosed in the drawing, a fitting generally designated 10 comprises a connector arranged for quick connection of a tube end 11 to another element (not shown). The connector is arranged to effect a locked connection of the tube end thereto by a simple finger manipulation of a nut member 12 thereof relative to a body member 13 thereof. The connector is further arranged to permit ready disconnection of the tube end therefrom by a simple reverse finger manipulation of the nut.

More specifically, nut 12 comprises an annular member formed of a suitable material such as nylon. The nut includes a cylindrical flange portion 14 provided with a bore 15 therethrough having a diameter slightly larger than the external diameter of tube end 11 and opening through an inner surface 16 of the nut. Extending longitudinally inwardly from the peripheral portion of flange 14 is an annular securing means 17 comprising a tubular extension 18 having an inner cylindrical surface 18a and an inturned inner end 19. The outer surface of the nut 12 is defined by a plurality of flat finger engaging surfaces 20 for facilitating the manipulation of the nut relative to body 13.

Body 13 comprises an annular member formed of a suitable material such as nylon and having an outer end 21 confronting inner surface 16 of the nut. Outer end 21 is provided with a stepped cylindrical recess 22 having an inner portion 23 and a diametrically larger outer portion 24. Body 13 further includes a mid-portion 25 peripherally defined by a plurality of wrench engaging surfaces 26, and an exteriorly threaded inner end 27 adapted for threaded connection to a complementary female element (not shown). Extending longitudinally through body 13 is a stepped bore 28 having an outer portion 29 opening into recess portion 23 and having a diameter similar to the diameter of bore 15 of nut 12, an inner portion 30 having a diameter substantially equal to the internal diameter of tube end 11, and a radial shoulder 31 between bore portions 29 and 30 and defining the inner end of bore portion 29 against which tube end 11 abuts when fully inserted into the connector.

Outer ends 21 of body 13 further defines an annular securing means 32 for co-operation with securing means 17 of nut 12 to connect rotatively the nut to the body for selective coaxial alignment of nut bore 15 and body bore portion 29 and axial disalignment thereof. More specifically, annular securing means 32 comprises a radially outwardly opening groove 33 adapted to receive inturned end 19 of securing means 17. Groove 33 is defined longitudinally outwardly by a radial inner end surface 34 of an annular boss 35 provided with an outer cylindrical surface 35a having an external diameter substantially equal to the diameter of surface 18a of securing means 17 and provided at its outer end with a frusto-conical camming surface 36 to facilitate the movement of inturned end 19 of securing means 17 over boss 35 into groove 33.

Tube end 11 is sealed to body 13 by means of a rubber O-ring 37 in inner portion 23 of recess 22. The internal diameter of the O-ring is sufficiently smaller than the outer diameter of tube end 11 to maintain the seal between the tube end and the body notwithstanding displacement of the tube end transversely to the axis of the O-ring to limits permitted by the bore portion 29. The O-ring is retained outwardly by its abutment with a rigid ring 38 comprising a steel washer disposed in portion 24 of recess 22. The internal diameter of washer 38 is similar to the diameter of bore 15 of nut 12 and, thus, when bore 15, washer 38, and bore portion 29 are coaxially aligned, tube end 11 may be freely moved therethrough to or from the position of FIG. 2. The outer diameter of washer 38 is slightly smaller than the outer diameter of recess portion 24 to allow constriction of body 13 during installation of the nut thereon; the difference in the diameter is small so that when the washer is displaced transversely to its axis to seat radially at one point of the recess portion 24, the corresponding radially inner surface portion 39 thereof is generally longitudinally aligned with a corresponding portion 40 of the body bore outer portion 29.

Tube end 11 is locked in connected relationship with fitting 10 by urging the tube end radially against body bore portion 40 and washer surface 39. To effect this transverse displacement of the tube end, at least one of the annular securing means 17 and 32 is eccentrically related to the bore of the corresponding nut and body member on which it is disposed. In the illustrated embodiment, each of the annular securing means is so eccentrically arranged. This is best seen in FIGS. 2 and 3 wherein the coaxially aligned axis A of the body bore 28 and axis A' of the nut bore 15 are shown displaced upwardly from the coaxially aligned axis B of the body surface 35a and axis B' of the nut surface 18a respectively. Thus, the arrangement shown in FIGS. 2 and 3 is the only one in which the nut bore 15 is coaxially aligned with the body bore portion 29. As discussed above, in this arrangement, tube end 11 may be readily moved into and from the fully inserted disposition of FIG. 2. To lock the tube end to fitting 10 in the fully inserted disposition, it is merely necessary to rotate nut 12 clockwise (as seen in FIGS. 3 and 5) relative to body 13 sufficiently to cause portion 41 of nut bore 15 to engage and urge tube end 11 transversely to its axis into abutment with washer surface 39 and body bore portion 40. The tube end is resultingly clamped securely therebetween with washer 38 effecting a substantially positive locking of the tube against longitudinal movement outwardly from the fitting. The deformable nature of the material of which the body is formed readily permits this locking engagement. The locking of the tube end may be effected with a relatively small amount of rotation of the nut relative to the body, such as one quarter turn. This arrangement of the fitting is shown in FIGS. 4 and 5. To release the tube end when desired from the fitting, the nut is merely reversely rotated back to the position of FIGS. 2 and 3, whereupon the aligned relationship of the bores and washer permits the ready longitudinal withdrawal of the tube end.

To facilitate the insertion of tube end 11 into the fitting, means are provided for locating the nut rotatively relative to the body in the angular relationship of FIGS. 2 and 3. These means include a projection 42 extending longitudinally from outer end 21 of body 13 into an arcuate recess 43 in inner surface 16 of nut flange 14 herein extending slightly over 180° concentrically with annular securing means 17. When the nut 12 is rotated to the position wherein end 44 of recess 43 abuts the projection 42, nut bore 15 is coaxially aligned with body bore portion 29. This substantially facilitates utilization of fitting 10 as a user merely rotates the nut to its counterclockwise extreme movement relative to the body to obtain the desired coaxial relationship.

From the foregoing description, it may be seen that fitting 10 comprises an extremely simple and economical connector effecting positive sealed connection of the tube end to the fitting body by simple manual manipulation of the nut. The tube end may be readily disconnected when desired by simple reverse manipulation of the nut.

While I have shown and described one embodiment of my invention, it is to be understood that it is capable of many modifications. Changes, therefore, in the construction and arrangement may be made without departing from the spirit and scope of the invention as defined in the appended claims.

I claim:

A fitting arranged for quick connection of a tube end, comprising: a body having an outer end, a stepped cylindrical recess in said outer end having an inner portion and a diametrically larger outer portion, a bore through the body opening into said recess and having a diameter slightly larger than the external diameter of the tube end, and annular securing means on the body; a resilient ring in the inner portion of the recess for sealing the tube end to the body, said resilient ring having an unstressed internal diameter smaller than the external diameter of the tube end; a rigid locking ring in the outer portion of the recess and defining a bore having an internal diameter slightly larger than the external diameter of the tube end and an external diameter smaller than the diameter of said outer portion of the recess and larger than the diameter of the inner portion of the recess; and a nut having an inner surface confronting the outer end of the body, a bore through the nut opening through said inner end and having a diameter slightly larger than the external diameter of the tube end, and annular securing means on the nut arranged to effect a radial constriction of said outer end of the body during installation of the nut on the body, each of said annular securing means being similarly eccentrically related to the bore of the one of the body or nut on which it is disposed for co-operating with the other securing means to connect rotatively the nut to the body with said nut bore in coaxial alignment with said body bore in one position of rotation of the nut relative to the body to receive the tube end freely in said bore, and with said nut bore in axial disalignment with the body bore in another position of rotation of the nut relative to the body to grip the tube end between a portion of the wall of the nut bore and aligned portions of the walls of each of the body and locking ring bores each spaced from the axis of the tube end no greater than the external radius of the tube end, said securing means on the body comprising a radially outwardly opening groove defined longitudinally outwardly by an annular boss having a bevelled outer end surface and a radial inner end surface and the securing means on the nut comprising an annular inturned flange slidable over said end surface and boss into locked reception in said groove.

References Cited in the file of this patent

UNITED STATES PATENTS

| | | |
|---|---|---|
| 1,214,985 | Barber | Feb. 6, 1917 |
| 1,275,182 | Ross | Aug. 6, 1918 |
| 1,912,299 | Parker | May 30, 1933 |
| 2,250,495 | Miller | July 29, 1941 |
| 2,251,253 | Miller | July 29, 1941 |
| 2,477,677 | Woodling | Aug. 2, 1949 |
| 2,478,149 | Wolfram | Aug. 2, 1949 |

FOREIGN PATENTS

| | | |
|---|---|---|
| 562,012 | Canada | Aug. 19, 1958 |